United States Patent
Kang et al.

(10) Patent No.: US 9,319,241 B2
(45) Date of Patent: Apr. 19, 2016

(54) FLOW-BASED PACKET TRANSPORT DEVICE AND PACKET MANAGEMENT METHOD THEREOF

(75) Inventors: Saehoon Kang, Daejeon (KR); Sunhee Yang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 199 days.

(21) Appl. No.: 13/619,854

(22) Filed: Sep. 14, 2012

(65) Prior Publication Data

US 2013/0163602 A1 Jun. 27, 2013

(30) Foreign Application Priority Data

Dec. 26, 2011 (KR) ........................ 10-2011-0142367

(51) Int. Cl.
*H04L 12/56* (2006.01)
*H04L 12/54* (2013.01)
*H04L 12/721* (2013.01)
*H04L 12/743* (2013.01)
*H04L 12/771* (2013.01)
*H04L 29/06* (2006.01)

(52) U.S. Cl.
CPC ............. *H04L 12/56* (2013.01); *H04L 45/38* (2013.01); *H04L 29/0653* (2013.01); *H04L 45/56* (2013.01); *H04L 45/7457* (2013.01)

(58) Field of Classification Search
None
See application file for complete search history.

(56) References Cited

U.S. PATENT DOCUMENTS

| | | | | |
|---|---|---|---|---|
| 7,633,944 B1* | 12/2009 | Chang | ................. | H04L 43/028 370/389 |
| 8,503,307 B2* | 8/2013 | Tourrilhes | ............ | H04L 41/0816 370/230 |
| 8,521,905 B2* | 8/2013 | Beliveau | ................. | H04L 67/327 370/224 |
| 8,737,215 B2* | 5/2014 | Uchida | ................. | H04L 43/026 370/231 |
| 2002/0131400 A1* | 9/2002 | Tinsley | ................. | H04Q 3/0045 370/352 |
| 2008/0189769 A1 | 8/2008 | Casado et al. | | |
| 2011/0261722 A1* | 10/2011 | Awano | ..................... | H04L 45/34 370/254 |
| 2011/0261723 A1* | 10/2011 | Yamato | ................... | H04L 45/34 370/255 |
| 2011/0286326 A1* | 11/2011 | Awano | .......................... | 370/225 |
| 2011/0307628 A1* | 12/2011 | Chiba | .................. | H04L 49/355 709/241 |
| 2011/0317559 A1* | 12/2011 | Kern | ....................... | H04L 45/02 370/235 |
| 2012/0155467 A1* | 6/2012 | Appenzeller | ................. | 370/392 |

FOREIGN PATENT DOCUMENTS

JP 2011-101245 5/2011

OTHER PUBLICATIONS

Mckeown, Nick et al., "OpenFlow: Enabling Innovation in Campus Networks," ACM SIGCOMM Computer Communication Review, vol. 38(2):69-74 (2008).

* cited by examiner

*Primary Examiner* — Candal Elpenord
(74) *Attorney, Agent, or Firm* — Nelson Mullins Riley & Scarborough LLP; Anthony A. Laurentano; Michael Malone

(57) ABSTRACT

Disclosed is a packet managing method of a packet forwarding device. The packet managing method includes receiving a packet; extracting flow information from the packet; searching a flow entry associated with the packet; and requesting the flow entry associated with the packet to a controller when a searching operation of the flow entry is failed. The request on the flow entry associated with the packet is not transferred within a reference time.

11 Claims, 5 Drawing Sheets

FLOW-BASED PACKET TRANSPORT DEVICE AND PACKET MANAGEMENT METHOD THEREOF

CROSS-REFERENCE TO RELATED APPLICATIONS

This U.S. non-provisional patent application claims priority under 35 U.S.C. §119 to Korean Patent Application No. 10-2011-0142367, filed on Dec. 26, 2011, the entirety of which is incorporated by reference herein.

BACKGROUND

The inventive concept relates to communication network and, more particularly, to a flow-based packet forwarding device and a packet managing method thereof.

In recent years, network business environment may change suddenly due to explosive increase in wireless data, caused by population of smart phones, and appearance of new types of application services such as social networks, clouds, smart televisions, and the like. Also, the network may be requested to receive new and various requirements more flexibly. Development on new network paradigm such as Software Defined Networking (SDN) may be proceeding actively.

The SDN may be new network technique capable of dynamically configuring and controlling a network dynamically according to various requirements of the user and service without limitation of a conventional closed network service environment. With the SDN, a control plane of a conventional network device separated from a forwarding plane may be collected at a centralized controller to control a software-based network overall. A typical example of the SDN may be the OpenFlow network.

In network system where control plane is separated from forwarding plane, packets arriving at forwarding device may be classified into flows according to header information, and may be processed according to matched flow entry searched at locally managed flow table.

If flow rule matching is failed, however, request for flow entry may be iteratively forwarded to the controller. In this case, load of the controller may increase, and bottleneck phenomenon of the controller may be caused. That is, the network performance may be lowered generally.

SUMMARY

Embodiments of the inventive concept provide a packet managing method of a packet forwarding device which comprises receiving a packet; extracting flow information from the packet; searching a flow entry associated with the packet; and requesting the flow entry associated with the packet to a controller when a searching operation of the flow entry is failed, wherein the request on the flow entry associated with the packet is not transferred within a reference time.

Embodiments of the inventive concept also provide a packet forwarding device comprising a flow search part searching a flow entry for a received packet; a flow processing part processing the received packet according to a procedure corresponding to the searched flow entry; a flow table management part managing a flow entry for each of flows in a flow table; and a flow entry request processing part requesting the flow entry to a controller, based on whether a flow entry request corresponding to the same flow exists within a reference time with respect to a receive packet that a searching operation of a corresponding flow entry by the flow search part is failed.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
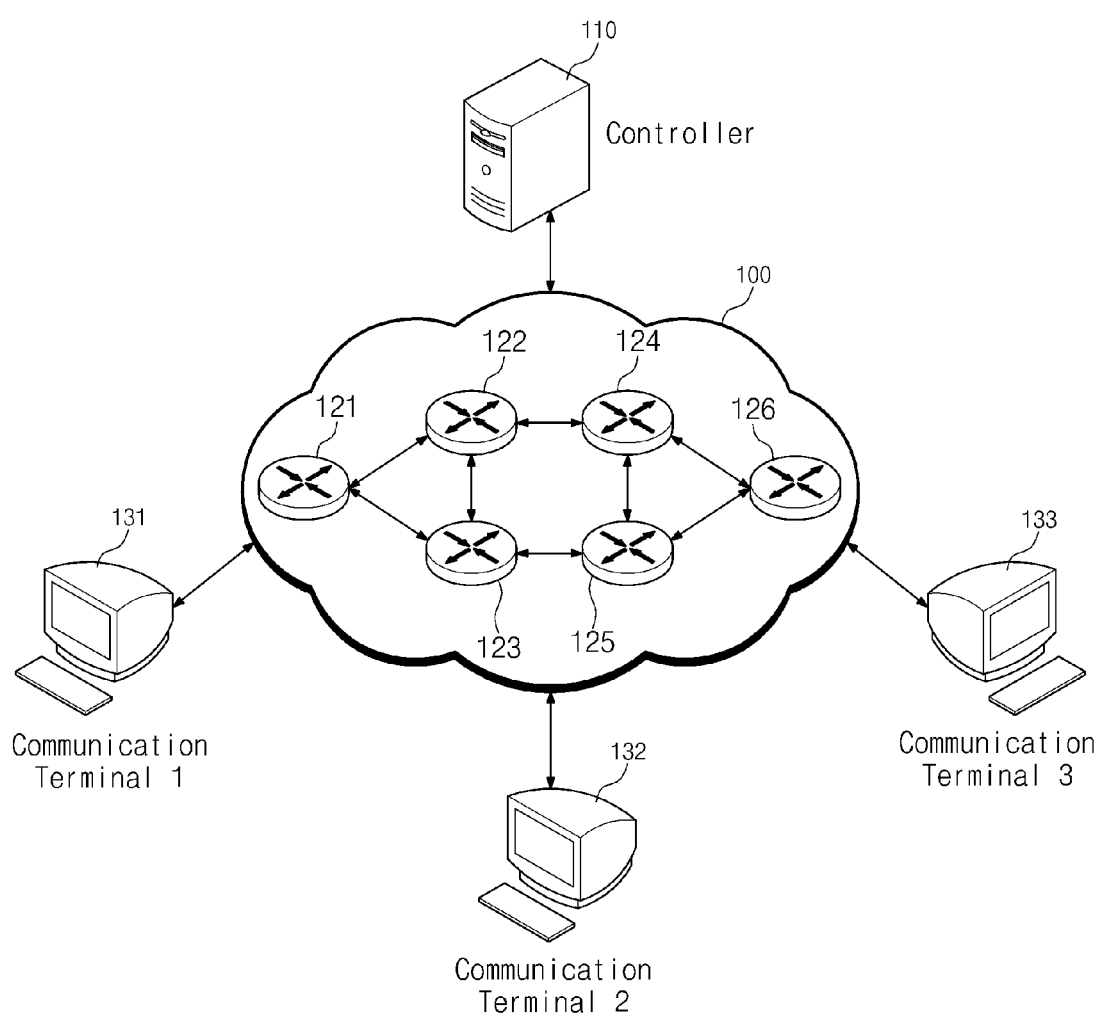
FIG. 1 is a schematic diagram illustrating an OpenFlow network system.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

OpenFlow proposed by the Open Network Foundation will be described with reference to a network system in which packet forwarding and controlling are separated. However, the inventive concept is not limited to the network system.

FIG. 1 is a schematic diagram illustrating an OpenFlow network system. An OpenFlow network system may include a network 100, a controller 110, and a plurality of communication terminals 131, 132, and 133.

The network 100 may include a plurality of OpenFlow switches 121 to 126 for providing destinations with packets forwarded from the communication terminals 131 to 133. The OpenFlow switches 121 to 126 and the controller 110 may be mutually communicated using the OpenFlow protocol.

Figure 2:
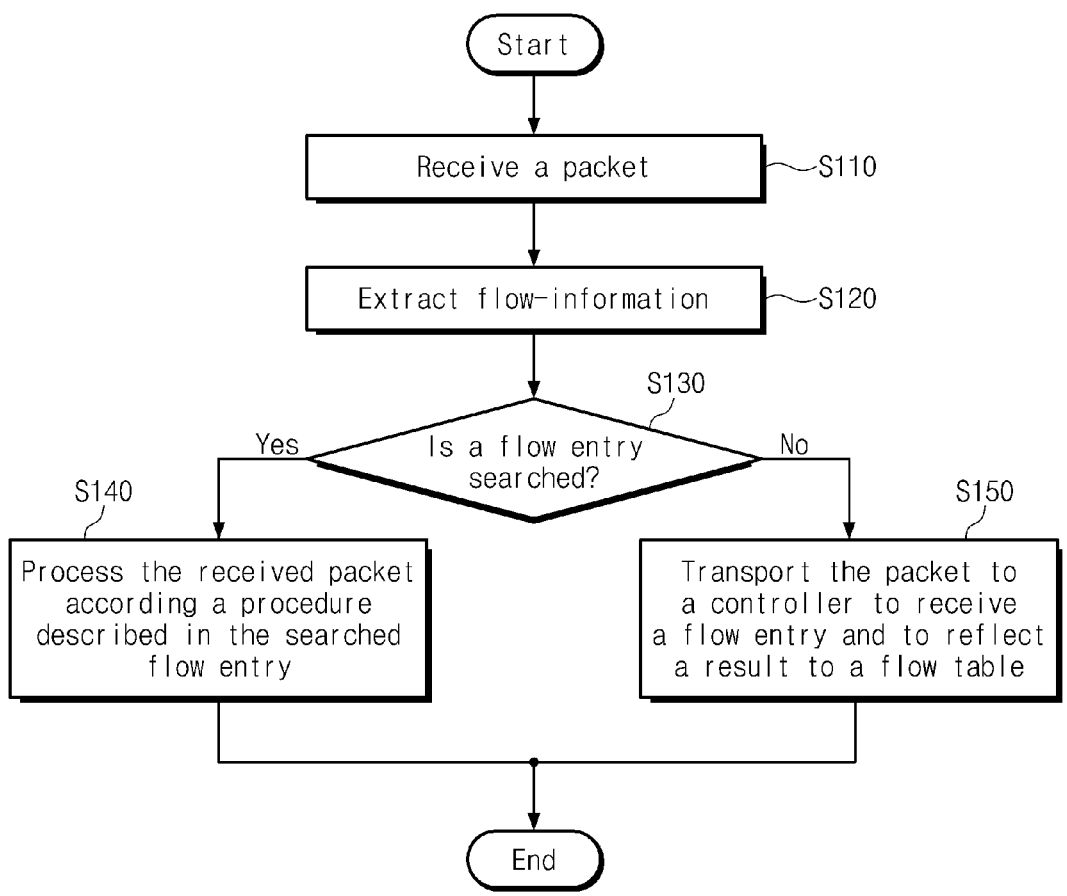
FIG. 2 is a flow chart illustrating a packet managing method in an OpenFlow switch of FIG. 1.

FIG. 2 is a flow chart illustrating a packet managing method of an OpenFlow switch in FIG. 1. Referring to FIG. 2, one OpenFlow switch (one of 121 to 126) may process the packet provided from one of the communication terminals 131 to 133 according to the following method.

In step S110, the OpenFlow switch may receive the packet transferred from the communication terminal.

In step S120, the OpenFlow switch may extract flow information from the packet.

In step S130, the OpenFlow switch may search whether a flow entry describing a processing procedure associated with a corresponding flow exists at a flow table. If the flow entry of the corresponding flow exists at the flow table, the method may proceed to step S140. If the flow entry of the corresponding flow does not exist at the flow table, the method may proceed to step S150.

In step S140, the OpenFlow switch may process the received packet according to the procedure described in the searched flow entry. For example, the OpenFlow switch may output the received packet to a specific port, drop the received packet, or revise a specific header field according to the searched flow entry.

In step S150, the OpenFlow switch may transfer the whole received packet or a portion of the received packet necessary for extracting the flow information to the controller 110. The controller 110 may configure the flow entry corresponding to the received packet to transmit it to the OpenFlow switch. The OpenFlow switch may process the packet according to the procedure defined with reference to the flow entry sent from the controller 110. Afterwards, the OpenFlow switch may update the flow table based on the processed result.

At this time, a corresponding packet may be buffered by a memory on the OpenFlow switch for a constant time such that a flow entry provided from the controller 110 is added to the flow table and then is transferred. At this time, a packet belonging to a new flow may be transmitted to the controller 110.

A time taken until a corresponding flow entry is defined by the controller 110 and is set to the flow table may be referred to as a reference time $\tau$. Also, packets belonging to a specific flow Z may be referred to as $\rho 1, \rho 2, \rho 3, \ldots, \rho n$, respectively. After a first reception packet $\rho 1$ arrives at the controller 110, a packet received within the reference time $\tau$ may be sent to the controller 110 due to failure of flow entry search.

As described above, at all the OpenFlow switches in the network 100, all the failed packets to find matched flow entry will be converged to the controller 110. And, the packet processing load of the controller 110 will increase. Eventually, the controller 110 may be a bottleneck point of the whole network system. Additionally, since a lot of packets are transmitted to the controller 110 during the reference time $\tau$ for setting the new flow entry in a high speed network circumstance, the load applied to the controller 110 may become greater in proportion to the number of the packets transmitted to the controller 110.

Figure 3:
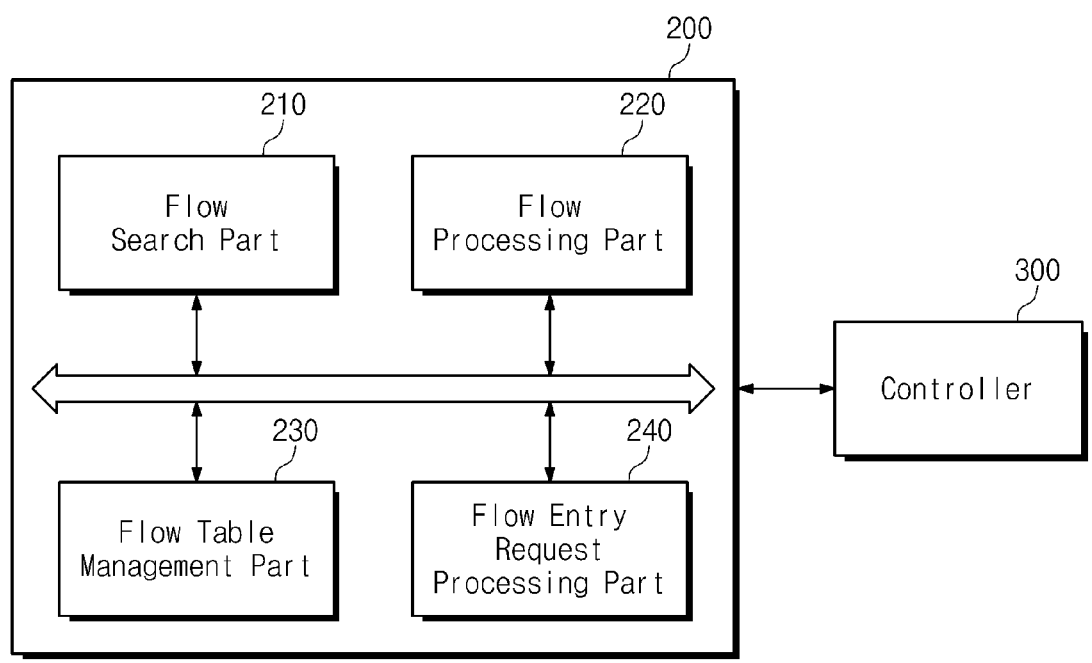
FIG. 3 is a block diagram illustrating a packet forwarding device according to embodiments of the inventive concept.

FIG. 3 is a block diagram illustrating a packet forwarding device according to embodiments of the inventive concept. A packet forwarding device 200 may include an OpenFlow switch described with reference to FIG. 1. Alternatively, the packet forwarding device 200 may be one of various elements constituting a flow-based network besides the OpenFlow switch. Referring to FIG. 3, the packet forwarding device 200 according to embodiments may reduce the number of repeated flow entry requests. The packet forwarding device 200 may include a flow search part 210, a flow processing part 220, a flow table management part 230, and a flow entry request processing part 240.

The flow search part 210 may extract flow information from a received packet. The flow search part 210 may search a flow table (not shown) managed by the flow table management part 230, based on the extracted flow information. The flow search part 210 may search a flow entry associated with the received packet. If the flow search part 210 successfully searches the flow entry associated with the received packet, the flow search part 210 may request the flow processing part 220 to process the received packet according to the searched flow entry. If an operation of searching the flow entry is failed, the flow search part 210 may request the flow table request processing part 240 to transmit the received packet to a controller 300.

The flow processing part 220 may output the received packet to a specific port, drop the received packet, or revise a specific header field according to a procedure described in the searched flow entry. It is well understood that the procedure defined in the flow entry is not limited to the above-described processes.

The flow table management part 230 may take full charge of management of the flow entries stored in the flow table. For example, the flow table management part 230 may periodically remove timeout flow entries. When a new flow entry is additionally requested from the flow entry request processing part 240, the flow table management part 230 may add the requested new flow entry to the flow table.

When the flow search part 210 requests a new flow entry, the flow entry request processing part 240 may judge whether a packet corresponding to the new flow entry is transferred to the controller 300 or not. In other words, if a failed packet occurs at a flow entry searching operation of the flow search part 210, the flow entry request processing part 240 may judge whether the packet is transferred to the controller 300 or not. The flow entry request processing part 240 may transfer a minimum quantity of data to the controller 300 according to the judgment result. Additionally, a new flow entry from the controller 300 is input, the flow entry request processing part 240 may send the new flow entry to the flow table management part 230 to be added to the flow table.

To judge whether a packet for a request of a flow entry transferred from the flow search part 210 is sent to the controller 300 or not, the flow entry request processing part 240 may judge whether a packet in the same flow was transferred to the controller 300 within a specific reference time $\tau$ or not. The specific reference time $\tau$ may be determined depending on a time from a time when a flow entry request packet is sent to the controller 300 until a time when a new flow entry is received from the controller 300. The specific reference time $\tau$ may be dynamically changed according to controller and network situations.

Even if the flow entry is not searched from the received packet, the packet transport device 200 of the inventive concepts may not repeatedly forward a flow entry request corresponding to the packet within the reference time $\tau$. Thus, it is possible to prevent a bottleneck phenomenon caused when a flow entry request is iteratively transferred. Additionally, the load of the controller 300 may be reduced, so that a resource is efficiently used to manage the network.

Figure 4:
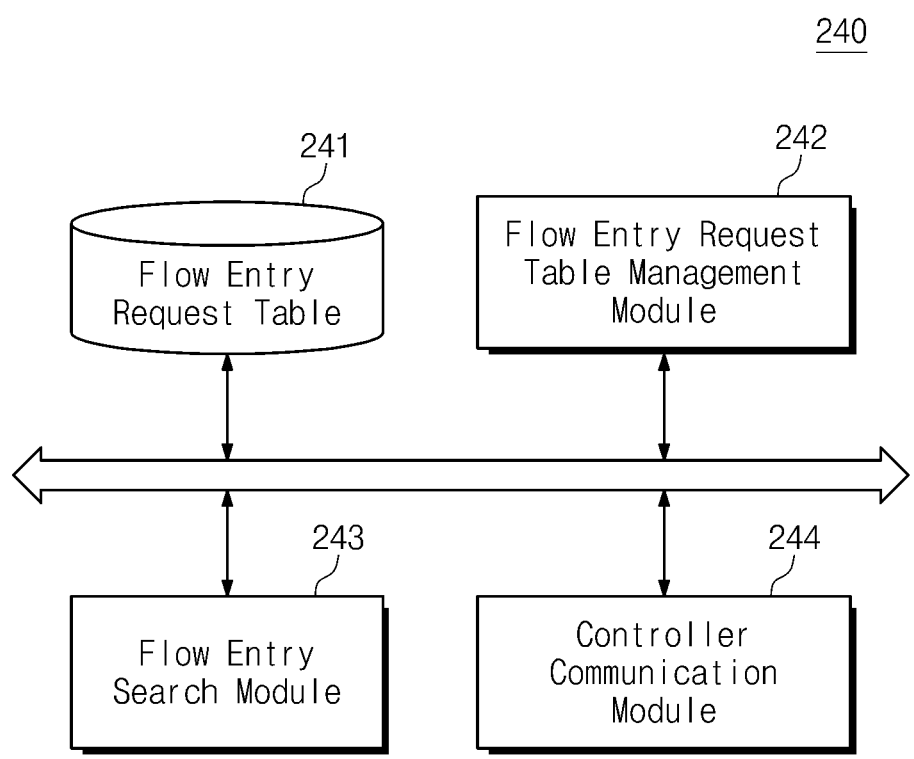
FIG. 4 is a block diagram illustrating a flow entry request processing part of FIG. 3.

FIG. 4 is a block diagram illustrating a flow entry request processing part of FIG. 3. Referring to FIG. 4, a flow entry request processing part 240 may include a flow entry request table 241, a flow entry request table management module 242, a flow entry search module 243, and a controller communication module 244.

When a new flow entry is requested from a flow search part 210 (refer to FIG. 3), the flow entry request table 241 may store and manage information used to judge whether a flow entry request associated with the same flow was transferred to a controller 300 or not. Each flow entry stored in the flow entry request table 241 may be formed of a flow key for distinguishing a flow and a timeout time. The flow entry request table 241 may exist separately from the flow table. Alternatively, the flow table may further include fields corresponding to a timeout point and whether a flow entry is requested to the controller 300, as occasion demands. The field indicating whether a flow entry is requested may be data indicating whether a flow entry request message is transferred to the controller 300, and a timeout time field may be data indicating how long a response to a flow entry request is waited.

The flow entry request table management module 242 may periodically remove timeout flow entries of the flow entries in the flow entry request table 241. When a new flow entry request is transferred to the controller 300, the flow entry request table management module 242 may add an entry having a corresponding flow used as a flow key and a timeout time (a current time+the reference time $\tau$) to the flow entry request table 241. The reference time $\tau$ may be determined depending on an average time from a time when the flow entry request message is transferred to the controller until a time when a response reply is received.

Whenever the flow entry search module 243 receives a new flow entry request, it may search the flow entry request table 241 to judge transferring of the request to the controller 300. If a matched entry exists in the flow entry request table 241, a request associated with the new flow entry may be reserved. If no matched entry exists in the flow entry request table 241, the entry search module 243 may request the flow entry request table management module 242 to add a flow request entry. And the flow entry search module 243 may transmit a flow entry request to the controller 300 through the controller communication module 244.

If the flow entry search module 243 does not receive the requested flow entry from the controller 300 within the reference time $\tau$, the reserved flow entry may be again requested after a time elapses. The reason may be that the flow entry request table management module 242 checks the timeout time of each flow entry to periodically remove timeout flow entries.

The controller communication module 244 may transfer a flow entry request to the controller 300 under the control of the flow entry search module 243.

As described above, the flow entry request message may not be repeatedly transferred to the controller 300 through the flow entry request processing part 240 within the reference time $\tau$. Thus, it is possible to save a communication resource and to prevent the load of the controller 300 due to processing of unnecessary requests.

Figure 5:
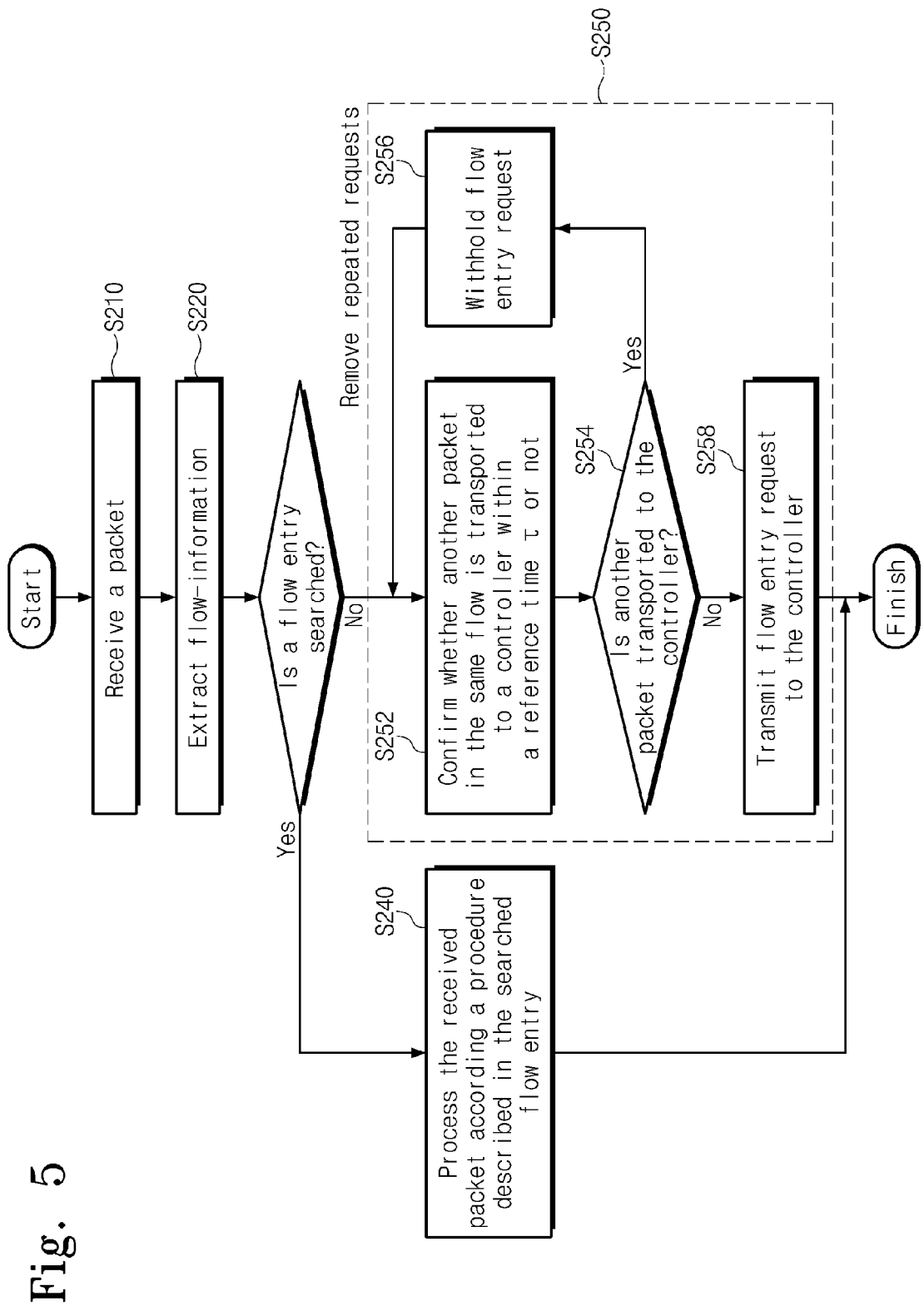
FIG. 5 is a flow chart illustrating a packet managing method of a packet forwarding device according to embodiments of the inventive concept.

FIG. 5 is a flow chart illustrating a packet managing method of a packet forwarding device according to embodiments of the inventive concept. Referring to FIG. 5, a packet forwarding device 200 of FIG. 3 does not repeatedly send a flow entry request associated with the same flow to a controller 300 within a reference time $\tau$.

In step S210, the packet forwarding device 200 receives a packet.

In step S220, the packet forwarding device 200 extracts flow information from the packet.

In step S230, the packet forwarding device 200 searches whether a flow entry describing a flow processing procedure exists at a flow table. If the flow entry of the corresponding flow exists at the flow table, the method proceeds to step S240. When the flow entry of the corresponding flow does not exist at the flow table, the method proceeds to step S250.

In step S240, the packet forwarding device 200 may process the received packet by the procedure described in the searched flow entry. For example, the packet forwarding device 200 may output the received packet to a specific port, drop the received packet, or revise a specific header field according to the searched flow entry.

The step S250 may be divided into steps S252, S254, S256, and S258.

In step S252, there may be checked whether a flow entry request associated with the same flow was transferred to the controller 300 or not. For example, this operation may be understood as an operation of searching a flow entry request table 241 as described with reference to FIG. 4.

In step S254, whether flow entry request is transferred within a reference time $\tau$ may be judged. If the flow entry associate with the same flow is requested to the controller 300 before the reference time $\tau$, the method proceeds to step S256. If the flow entry associated with the same flow is not requested before the reference time $\tau$, the method proceeds to step S258.

In step S256, since the flow entry associated with the same flow is requested before the reference time $\tau$, the flow entry requested to the controller 300 may be reserved. And the method proceeds to step S252. The flow entry associated with the same flow may be requested after the reference time $\tau$ elapses, by a loop of steps S252, S254, and S256.

In step S258, the packet forwarding device 200 may transfer a request on a flow entry associated with the corresponding packet to the controller 300.

According to embodiments of the inventive concept, due to the flow entry request processing part, it is possible to remove repeated requests for the same flow of the flow entry requests transported to the controller. Thus, the communication resource may be saved and it is possible to reduce or prevent the load of the controller which is caused by processing unnecessary requests.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A packet managing method of a packet forwarding device, comprising:
    receiving a packet;
    extracting flow information from the packet;
    searching a flow entry associated with the packet;
    searching a flow entry request table, when a flow entry associated with the packet is not found, to judge whether a request on another flow entry corresponding to the same flow is transferred to the controller within a reference time or not;
    reserving a request of transmitting the flow entry associated with the packet when a request on the other flow entry corresponding to the same flow is transferred to the controller within the reference time; and transferring the request of transmitting the flow entry associated with the packet to a controller after the reference time, wherein when the request on the flow entry associated with the packet is determined to already be transferred to the controller once, the request is not repeatedly transferred within a reference time.

2. The packet managing method of claim 1, wherein the flow entry request table includes a flow key field for distinguishing a plurality of flow entries and a timeout time field indicating a transfer point of time of a flow entry request corresponding to each of the plurality of flow entries.

3. The packet managing method of claim 2, wherein a sum of a current time and the reference time is recorded at the timeout time field.

4. The packet managing method of claim 2, wherein if the requested flow entry is not transferred from the controller even when the timeout time elapses, information of the flow is removed from the flow entry request table.

5. The packet managing method of claim 1, further comprising:

transferring the flow entry request to the controller when the other flow entry request corresponding to the same flow does not exist within the reference time.

6. The packet managing method of claim 1, wherein the searching a flow entry associated with the packet comprises:

processing the packet according to a procedure defined in the flow entry if the flow entry associated with the packet exists.

7. A packet forwarding device comprising:

a flow table configured to store a plurality of flow entries;

a flow entry request table configured to store a plurality of flow entry requests;

a flow search part configured to search a flow entry for a received packet in the flow table;

a flow processing part configured to process the received packet according to a procedure corresponding to the searched flow entry;

a flow table management part configured to manage a flow entry for each of flows in the flow table; and a flow entry request processing part configured to transmit a flow entry request associated with the received packet, to a controller, based on whether the flow entry request corresponding to the same flow exists in the flow entry request table within a reference time with respect to the received packet that a searching operation of a corresponding flow entry by the flow search part is failed, wherein, when the flow entry request associated with the received packet is determined to already be transferred to the controller once, the request is not repeatedly transferred within the reference time, wherein the flow entry request associated with the received packet is reserved when a request on the other flow entry corresponding to the same flow is transferred to the controller within the reference time; and the flow entry request associated with the received packet is transferred to a controller after the reference time.

8. The packet forwarding device of claim 7, wherein the flow entry request processing part includes a flow entry request table including a flow key field for distinguishing a plurality of flow entries and a timeout time field indicating a transfer point of time of a flow entry request corresponding to each of the plurality of flow entries.

9. The packet forwarding device of claim 8, wherein the flow entry request processing part includes a flow entry search module which is configured to determine whether a request for the flow entry is transferred to the controller, based on the flow entry request table whenever the request for the flow entry occurs.

10. The packet forwarding device of claim 9, wherein the flow entry request processing part includes a controller communication module which is configured to transfer the request for the flow entry to the controller under a control of the flow entry search module.

11. The packet forwarding device of claim 8, wherein the flow entry request processing part includes a flow entry request table management module which is configured to periodically remove timeout entries of the flow entries existing in the flow entry request table.

* * * * *